US005961272A

United States Patent [19]

Short

[11] Patent Number: 5,961,272

[45] Date of Patent: Oct. 5, 1999

[54] WASTE RECEPTACLE TRANSPORT DEVICE

[76] Inventor: Russell J. Short, 10 Hidden Meadow La., Scotts Valley, Calif. 95066

[21] Appl. No.: 09/034,647

[22] Filed: Mar. 4, 1998

[51] Int. Cl.[6] .................... B60R 09/06

[52] U.S. Cl. .................... 414/462; 224/282; 224/514; 224/519; 224/537

[58] Field of Search .................... 414/462; 224/282, 224/512, 514, 519, 530, 532, 533, 536, 537

[56] References Cited

U.S. PATENT DOCUMENTS

| | | | |
|---|---|---|---|
| 5,209,628 | 5/1993 | Hassell | 414/462 |
| 5,346,357 | 9/1994 | Hassell | 414/462 |
| 5,518,357 | 5/1996 | Ziaylek, Jr. | 414/462 |
| 5,738,261 | 4/1998 | Dula | 414/462 X |
| 5,791,857 | 8/1998 | Ziaylek, Jr. et al. | 414/462 |

*Primary Examiner*—Janice L. Krizek

[57] ABSTRACT

A vehicle mounted carrier for lifting and securing in an elevated position waste receptacles and other articles for transport. A housing including a pair of side plates, a rear plate and a bottom plate having aperatures for mounting to a conventional trailer tow hitch assembly or to a vehicle bumper. A pair of lever arms terminate at one end in a channel for receiving the article of transport and are pivotably connected to the housing at the opposite end. A latch assembly is provided for securing the article of transport in an elevated position and for selectively releasing allowing the user to controllably lower and disengage the article of transport. The latch assembly includes a latch bar operably secured to one of the lever arms and a spring secured to the latch bar and to a lever handle. A pair of lever arm stop elements are secured to the housing and limit the rotation of the lever arms.

20 Claims, 11 Drawing Sheets

WASTE RECEPTACLE TRANSPORT DEVICE

BACKGROUND OF THE INVENTION

1. Field of the Invention:

The invention relates to receptacle transport devices, and more particularity to transport devices for transporting waste receptacles on vehicles.

2. Description of Prior Art

Many waste disposal companies are providing their customers with special trash receptacles and recycle bins for weekly curbside pickup. The receptacles provided by the waste disposal companies are typically larger in size and accommodate greater volume and weight than typical thirty-two gallon trash receptacles. Many of these receptacles are equipped with a horizontal lift bar for automated dumping into waste disposal vehicles. Typically the receptacles are equipped with wheels which allow the user to wheel the receptacles to the desired location.

In many rural areas the trash source location, typically a residence, is located a considerable distance to the waste disposal company pick-up point, typically the public right-of-way. The oversized trash receptacles will not fit into most passenger vehicles and the increased weight capacity these receptacles accommodate make it difficult to lift the fully loaded receptacle into the bed of a pick-up truck or into the trunk of a passenger vehicle.

One current method of transporting the trash receptacles is by means of a trailer. Transporting the trash receptacles in a trailer towed behind a passenger or light truck vehicle has several disadvantages.

a) With a trailer in tow, vehicle maneuvering is restricted or requires special attention.

b) Trailers may not accommodate various sizes of trash receptacles.

c) Trash receptacles must be secured to prohibit overturning when transporting on steep terrain.

d) The trailer must be left at the pick up point thereby subject to theft or vandalism or the trailer must be returned to the residence, and then towed back again to recover the emptied trash receptacle.

e) A trailer towing hitch is required to tow.

There is needed, therefore a means for transporting the oversized and over-weighted trash receptacles without the limitations described for trailering and in a method which does not require the user to lift the full loaded weight of the trash receptacle in order to transport.

Another current method of transporting the trash receptacles is for the user to manually wheel the trash receptacle to the waste disposal company pick-up point. This method is often impractical due to the distance required for transport, inclement weather, slope or condition of terrain, and automatic gates which open only upon sensing an approaching vehicle.

SUMMARY OF INVENTION

The carrier described herein serves to fulfill the need by providing a means of transporting the oversized trash receptacles equipped with a horizontal lift bar by a passenger or light truck vehicle from the point of trash generation (typically a residence) to the waste company pick up point (typically the public right of way) without having to manually lift the full weight of the loaded receptacle. The carrier can accommodate various sizes of the trash receptacles and can be mounted on a trailer towing assembly or bumper hitch assembly, temporarily supported by brackets permanently attached to the bumper of a vehicle or supported by straps mounted to a vehicle.

In one form of the carrier, this need is realized by a pair of lever arms which terminate at one end at a channel designed to receive a horizontal lift bar of the receptacle. The other end of the lever arms are attached to a housing base. The housing base consists of a bottom and rear plate with end side panels on each side. The lever arms are mounted to the side panels and are free to pivot. The housing base can be mounted at the exterior of a vehicle typically at a trailer towing receiver system or bumper hitch system. Alternate methods of mounting the carrier on the exterior of a vehicle include temporarily suspending the carrier on brackets permanently mounted to the bumper of the vehicle or strapping the carrier to the vehicle.

To load the trash receptacle, the horizontal bar of the trash receptacle is placed into the channel with the lever aims n the down position. A horizontal and slightly upward force applied to the trash receptacle by the user lifts the receptacle. This force is continued until the receptacle is lifted to the full up position at which point the lever arms are automatically latched in the up position. The latching of the lever arms is accomplished by a handle, spring and latch bar assembly. A handle and latch bar each pivot on one of the lever arms and are interconnected by a spring.

To ready the carrier for automatic latching prior to loading the receptacle, the lever arms are lowered and a handle is manually positioned applying tension to a spring which applies a counter clockwise rotational force to the latch bar. As the lever arms are rotated up, a latch mounted to a housing plate restricts and guides the rotation of a latch bar. In the up position the latch bar is pulled by the spring tension into a groove in the latch, latching the lever arms in the up position. At this point, the trash receptacle is suspended clear of the ground and is ready for transport.

To lower the receptacle and lever arms, the user manually repositions a handle which applies a clockwise rotational force to the latching bar. In the up position the weight of the trash receptacle holds the latch bar tight to the latch and prohibits the clockwise rotation. With the handle in this position, the receptacle and lever arms are held in the up position until the user applies a horizontal force to the receptacle opposite the gravitational force imparted by the trash receptacle, allowing the latch bar to move free of the latch and allowing for rotation of the latch bar. The latch bar rotates free from the latch and allows the user to lower the trash receptacle and lever arms in a controlled manner.

The carrier can be mounted to a vehicle in several methods. In the preferred method, the housing base is attached to a standard trailer towing hitch bar or vehicle bumper hitch. This attachment is accomplished by positioning the one inch diameter hole in the bottom of the base plate over the hole in the hitch bar or bumper hitch and inserting the treaded portion of the hitch ball through both base plate and hitch bar or bumper hitch. The hitch ball is secured in place with the application of a threaded nut and lock washer, thus clamping the housing base and hitch bar or bumper hitch together. Rotation of the housing base is restricted by stops located on the bottom of the housing base and positioned on each side of the hitch bar.

A feature of the carrier, when mounted as described above and with the lever arms latched in the up position, is that a trailer coupler can be attached to the hitch ball without removing the carrier. Therefore normal towing can occur with the carrier in place.

BRIEF DESCRIPTION OF THE DRAWING FIGURES

Figure 8B:
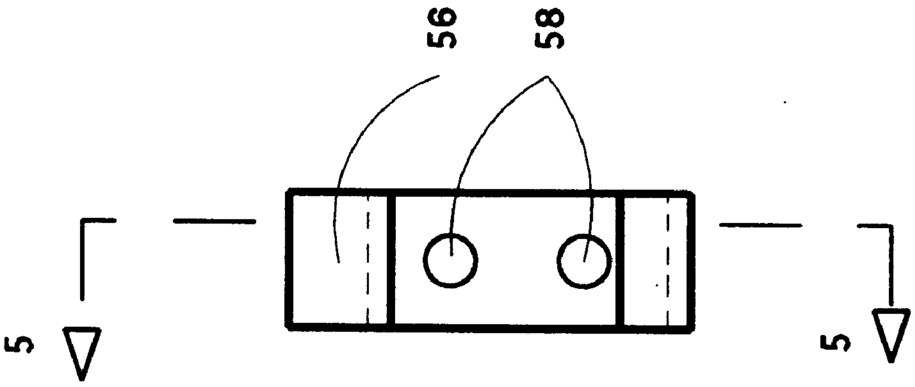
Figure 8A:
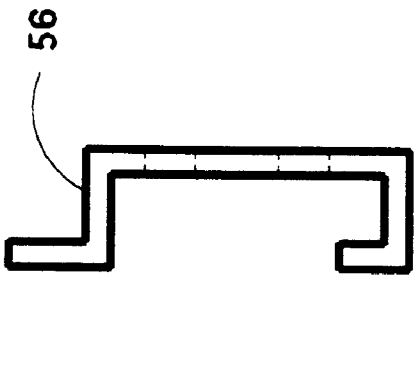

FIG. 8*a* shows a side view of the mounting bracket.

FIG. 5*b* shows a front view of the mounting bracket.

Figure 9A:
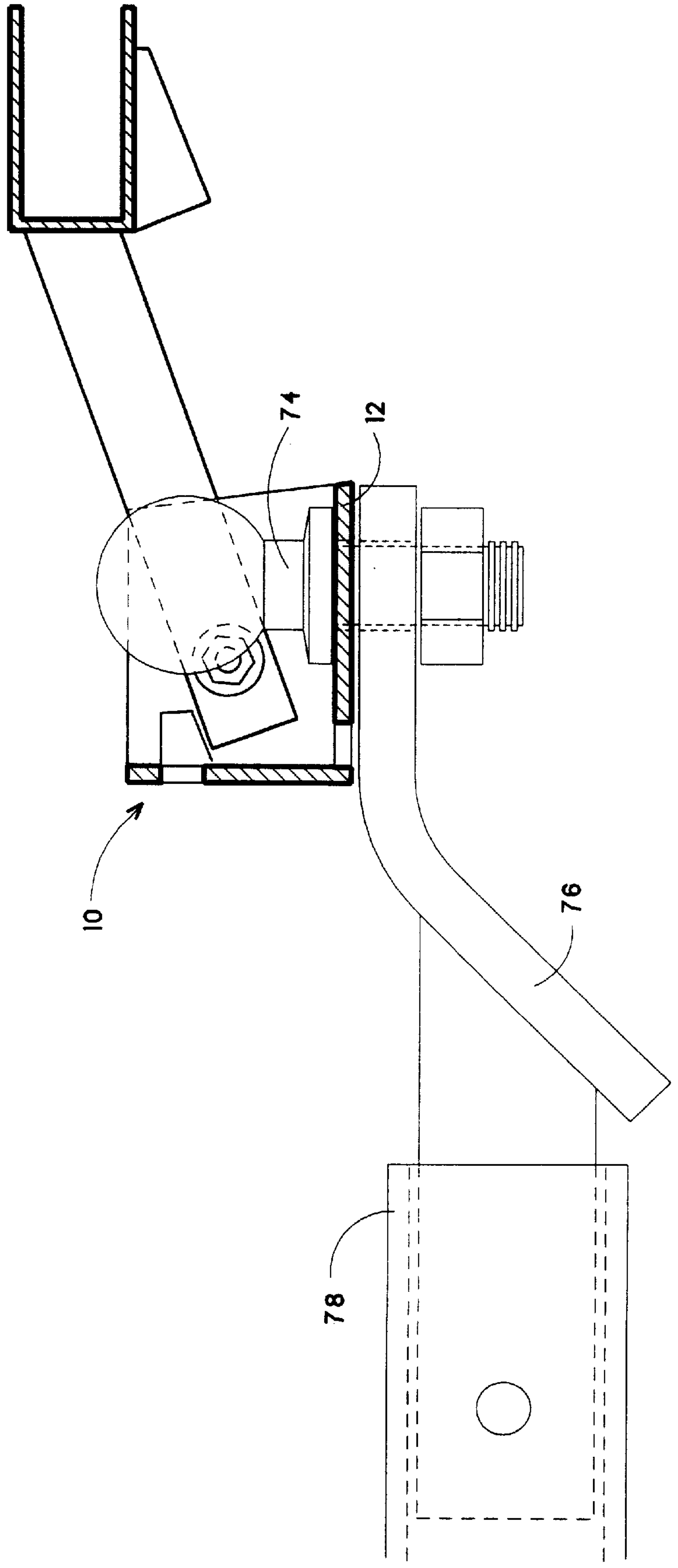
Figure 9B:
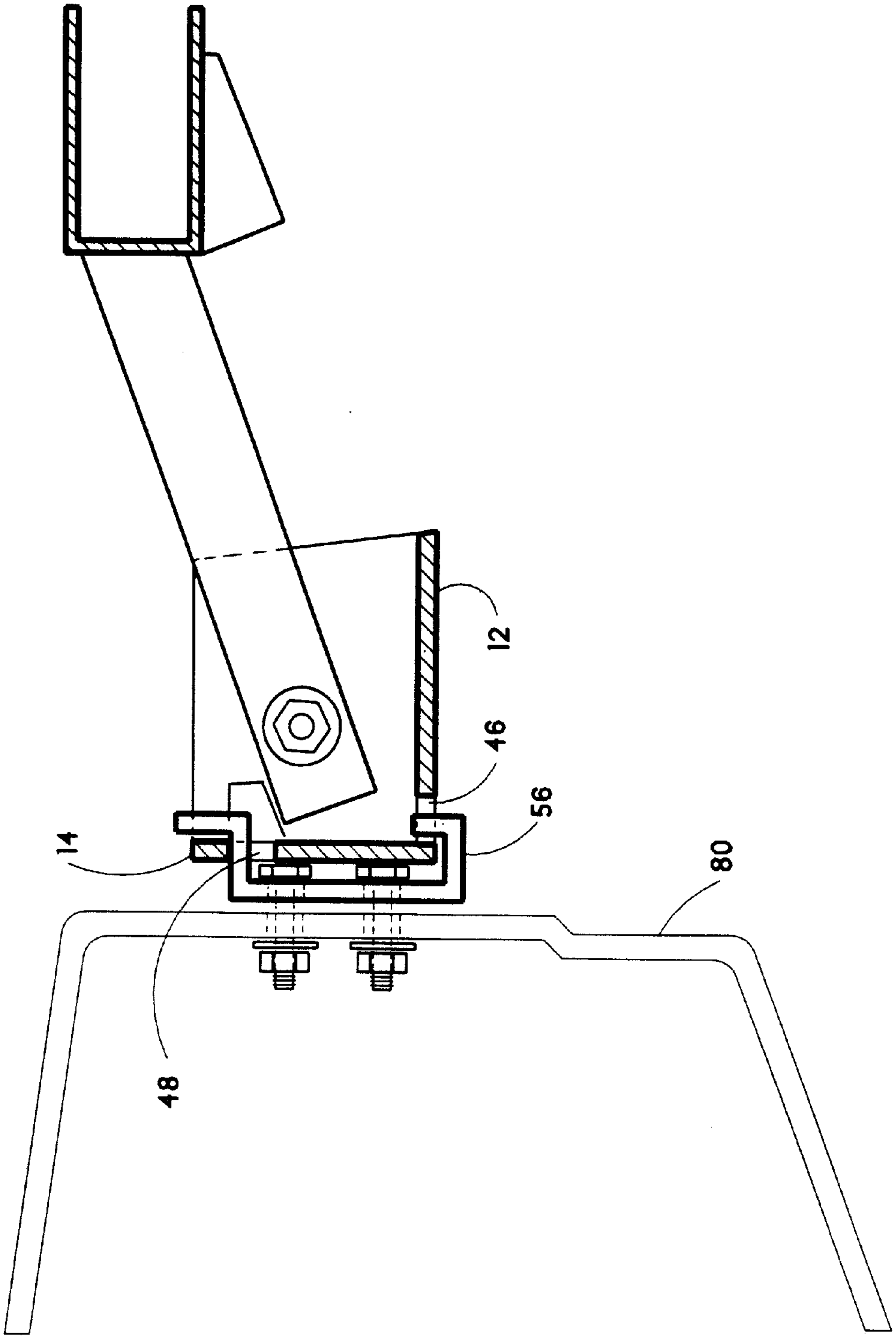

FIG. 9*a* shows the carrier in section view mounted to a conventional trailer hitch bar assembly FIG. 9*b* shows the carrier in section view mounted to a vehicle bumper by means of brackets attached to the bumper.

Figure 9C:
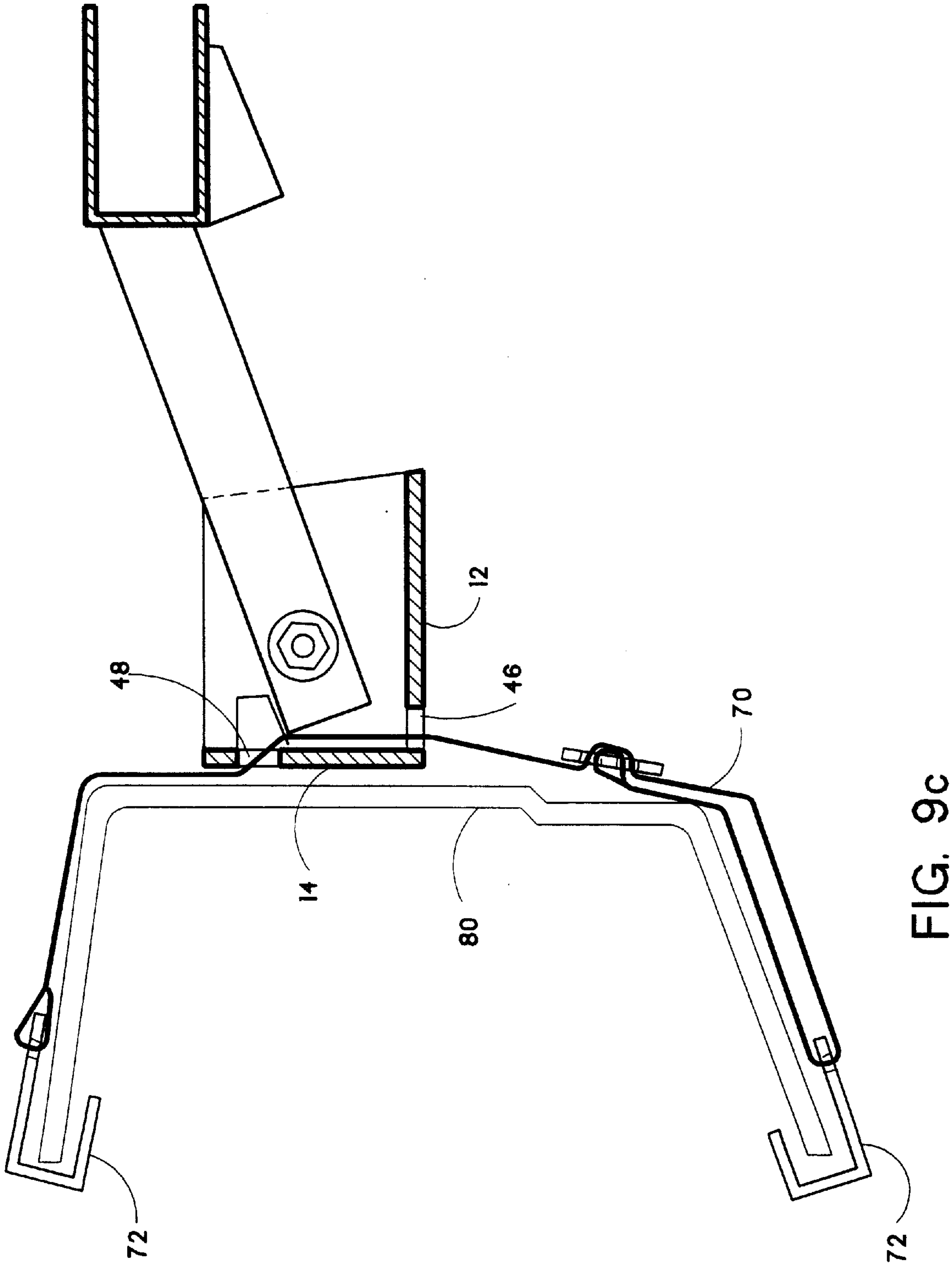

FIG. 9*c* shows the carrier in section view mounted to a vehicle bumper by means of straps hooked to the vehicle.

DETAILED DESCRIPTION OF THE PREFERRED EMBODIMENT

Figure 1:
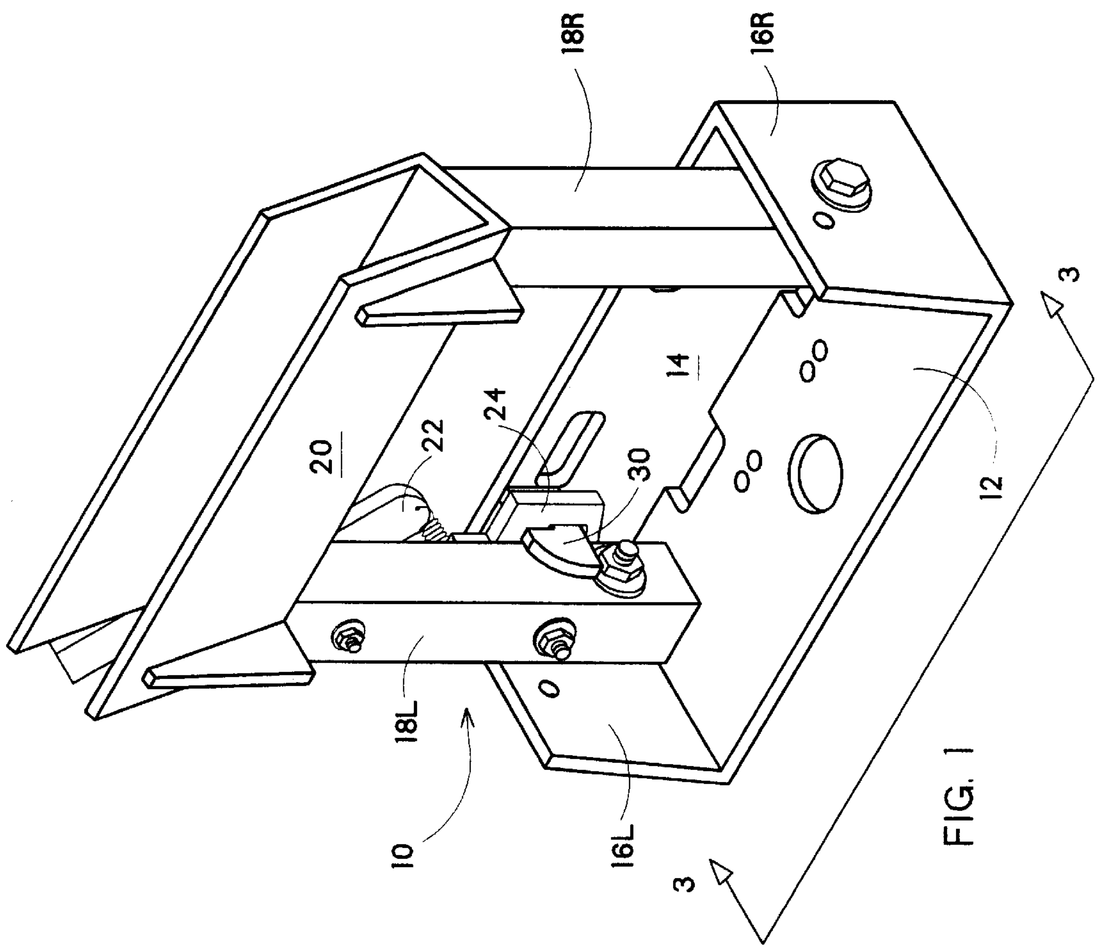
FIG. 1 shows an isometric view of the carrier with the lever arms in the up and latched position.

Referring to FIG. 1, it will be seen that an illustrative embodiment of the carrier is designated by the reference numeral 10 as a whole. The body of the carrier consists of a housing bottom plate 12, a housing rear plate 14, and a right and left housing side plate 16R and 16L respectively. In the preferred embodiment, the housing plates are constructed of flat steel plate and welded together at their intersections. However the housing plates can consist of any rigid material of sufficient rigidity to resist the loads imparted and which can be joined or formed.

Figure 2:
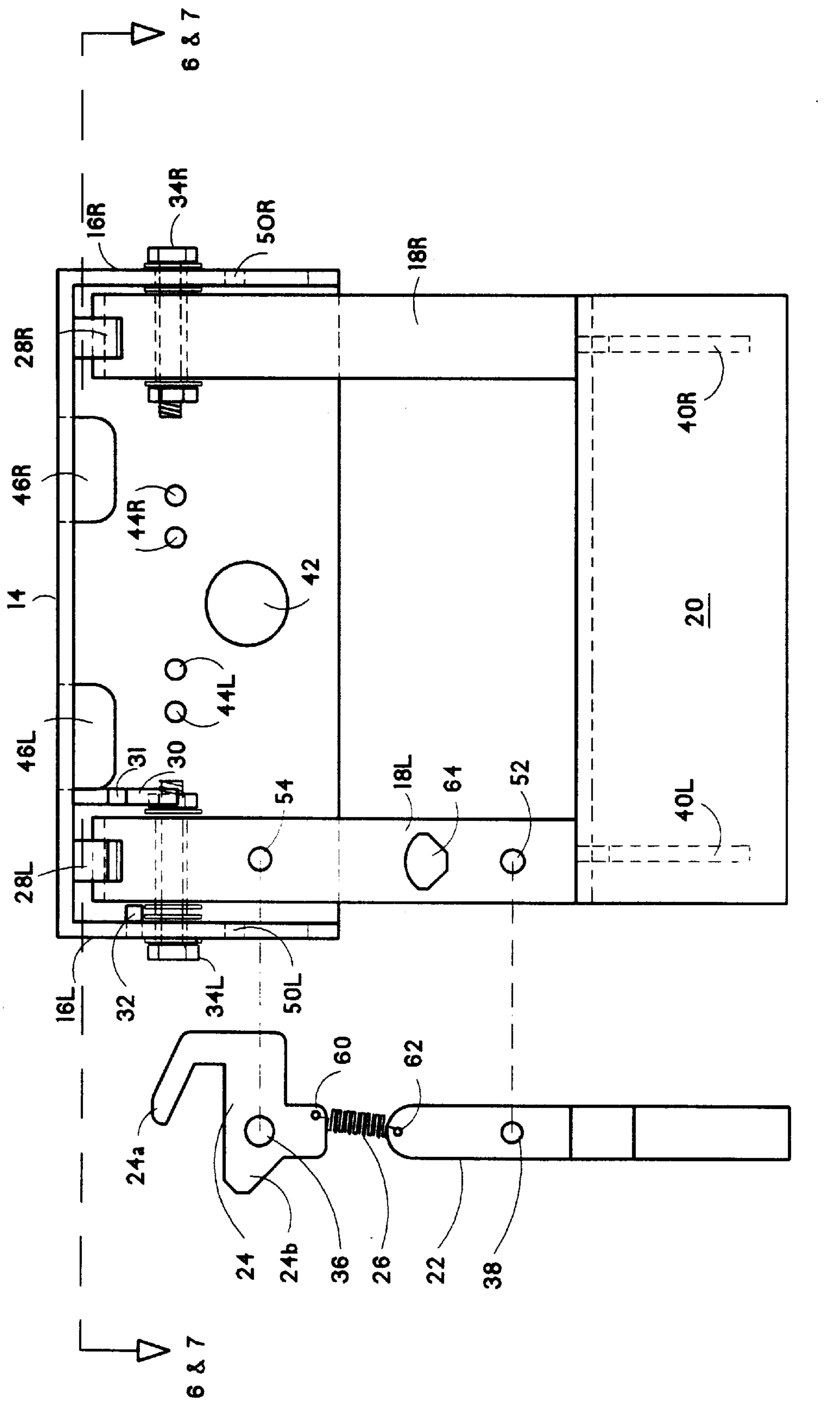
FIG. 2 shows a top view with the lever arms in the down position and the lever handle/latch bar assembly indicated exploded from the lever arm.

Referring to FIG. 2 a right and left lever arm 18R and 18L respectively are positioned parallel to each other. Said lever arms are joined by a receiver channel 20 at one end. The width of the combination lever arms 18 and receiver channel 20 is sufficient to provide clearance between the interior walls of the housing side plates 16R and 16L. Additional clearance is provided to accommodate a latch bar stop 32.

The lever arms 18R and 18L are secured to the housing side plates 16R and 16L by lever arm mounting assembly 34R and 34L respectively comprised of bolt, washers, and nut assembly. The bolt of mounting assembly 34 is inserted through a mounting hole in the housing side plates 16 and through the full width of the lever arms 18. Washers are located between the interior wall of housing side plates 16 and the lever arms 18 to produce the desired clearances. Lever arms 18 are free to pivot about lever arm mounting assembly 34R and 34L. The degree of rotation of lever arms 18 is restricted by a lever arm stop 28R and 28L. Lever stops 28 restrict the rotation of lever arms 18 to approximately twenty degrees of horizontal when lever arms 18 are in the down position. This angle from horizontal is approximate and shall be of sufficient degree to cause rotation of the lever arms 18 when a horizontal force is applied to receiver channel 20. Lever stops 28R and 28L also serve to restrict the degree of rotation of the lever arms 18 in the up position. Lever stops 28R and 28L restrict the degree of rotation of lever arms 18 to several degrees beyond vertical. The extent of rotation is depicted in FIG. 4 with lever arms 18 indicated in the down position as bold line weight and in the up position indicated as dashed line.

Figure 4:
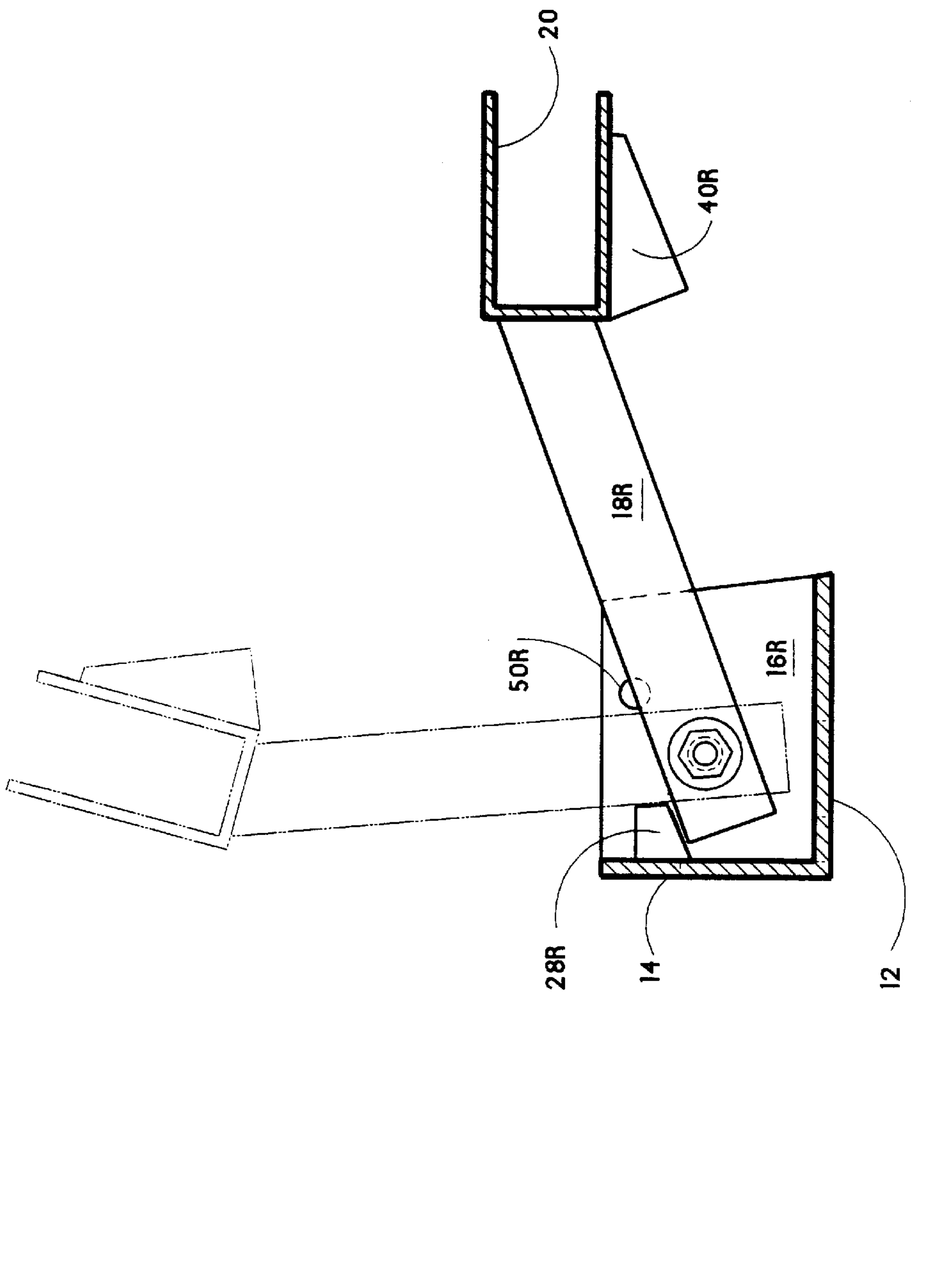
FIG. 4 shows a section and indicates the lever arm in the down position (bold line) and in the up position (dashed line).

Referring to FIG. 4, the receiver channel 20, consisting of a steel channel is welded to lever arms 18R and 18L which consist of tube steel. Lever arms 18 can be constructed of alternate shapes or material sufficient to withstand the loads imparted. With lever arms 18 in the down position, receiver channel 20 is horizontally mounted. The length of channel 20 is approximately one and a half inches shorter than the horizontal lift bar of the receptacle being transported. This length allows for flexibility in positioning the receptacle in relation to the receiver channel 20. The width of receiver channel 20 is approximately thirty percent wider than the diameter of the horizontal lift bar of the receptacle. This additional width compensates for horizontal lift bars of the receptacle which might be bent. The depth of receiver channel 20 is sufficient to prohibit the horizontal lift bar of the receptacle from accidentally being jolted out of the receiver channel 20 during transport.

A right and left guide plate 40R and 40L respectively is welded to channel 20. The guide plates 40 serve two functions. First, to restrict the rotation of the article being transported and second, as a stiffener plate for channel 20. The leading edge of guide plates 40 align with the front edge of housing side plates 16 when lever arms 18 are in the full up position.

Figure 5:
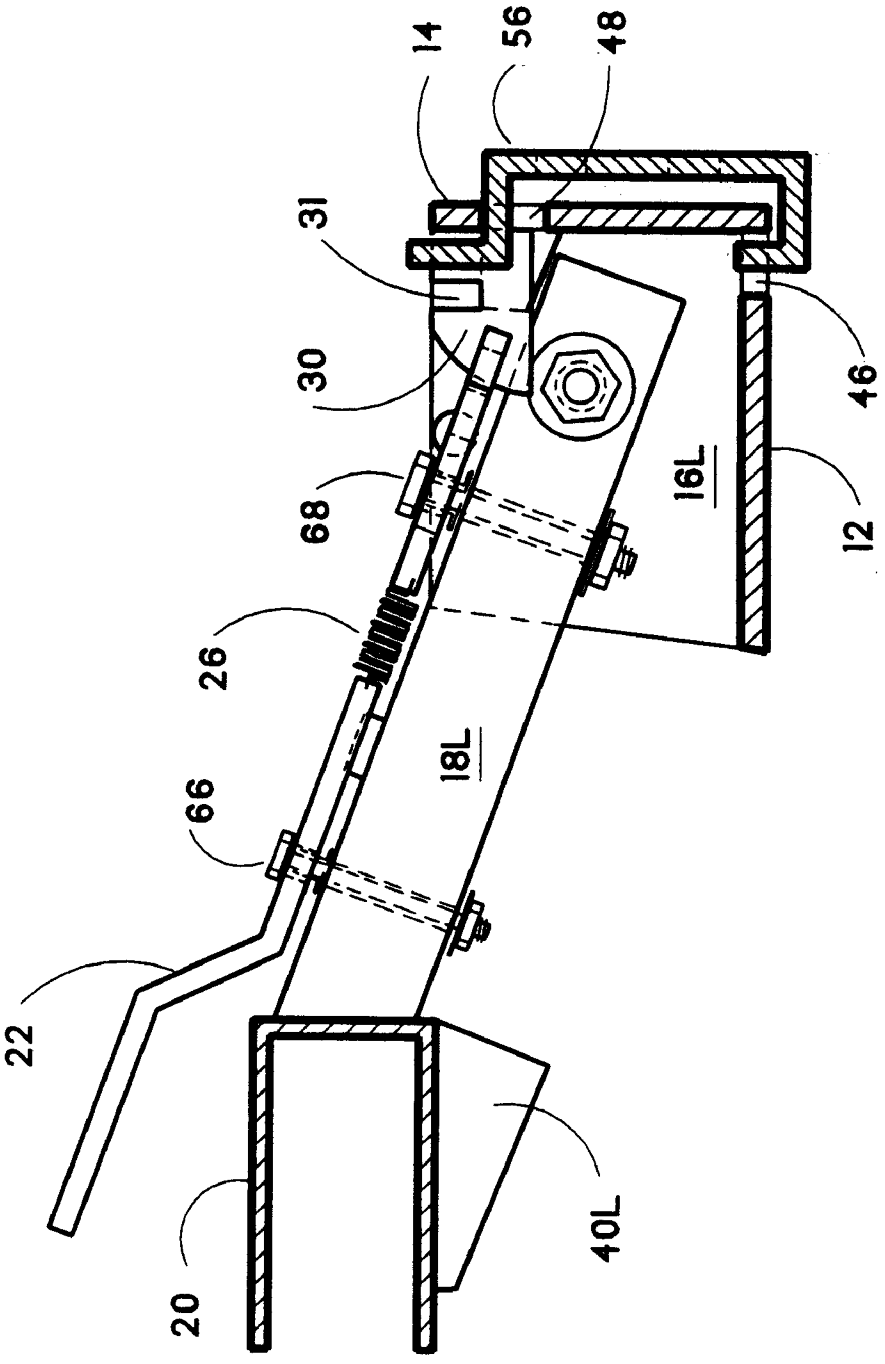
FIG. 5 shows a section with the lever arm in the down position and indicated mounting with the bracket.

Returning to FIG. 2, a latch bar 24 is shown. In FIG. 5, a latch bar mounting assembly 68 comprised of a bushing, bolt, washer, and nut assembly is indicated. Returning to FIG. 2, a portion of lever arm 18L having two holes located on opposite sides of lever arm 18L are designated as latch bar through-holes 54. Latch bar 24 rotates about a latch bar mounting hole 36. The bolt of latch bar mounting assembly 68 is inserted through the latch bar mounting hole 36 and through the latch bar through-hole 54. The bushing of latch bar mounting assembly 68 is located in the latch bar mounting hole 36. The bushing is slightly deeper than the depth of latch bar 24 to enable latch bar 24 to rotate freely independent of the amount of tightening force applied by the latch bar mounting assembly 68.

A lever handle 22 is indicated in FIG. 2. In FIG. 5, a lever handle mounting assembly 66 comprised of a bushing, bolt, washer, and nut assembly is indicated. Returning to FIG. 2, the lever handle 22 is mounted to lever arm 18L in a similar manner as noted above for the latch bar 24. A portion of lever arm 18L having two holes located on opposite sides of lever arm 18L are designated as lever handle through-holes 52. Lever handle 22 rotates about a lever handle mounting hole 38. The bolt of lever handle mounting assembly 66 is inserted through the lever handle mounting hole 38 and through the lever handle through-holes 52. The bushing of lever handle mounting assembly 66 is located in the lever handle mounting hole 38. The bushing is slightly deeper than the depth of lever handle 22 to enable lever handle 22 to rotate freely independent of the amount of tightening force applied by the lever handle mounting assembly 66. Washers or similar spacers are located between lever handle 22 and lever arm 18L and comprise a part of lever handle mounting assembly 66. Lever handle 22 is mounted in a parallel plane to lever arm 18L with the exception of an offset at the longitudinal center of lever handle 22. The offset of lever handle 22 is angled away from lever arm 18L at a sufficient angle and length to allow the upper return of lever handle 22 to be easily grasped and rotated.

Lever handle stop 64 is mounted on the same surface of lever arm 18L as latch bar 24 and lever handle 22. Lever handle stop 64 has a concave, surface which is positioned underneath the lower portion (near spring) of lever handle 22. The outer right and left surfaces of lever handle stop 64 are vertical. The height of the vertical surface extends above the underside (side near lever arm 18L) of lever handle 22. As lever handle 22 rotates over lever handle stop 64 the concave surface lifts the lower end of lever handle 22 out of plane. As lever handle 22 is rotated beyond lever handle stop 64, lever handle 22 returns to plane and the vertical surface of lever handle stop 64 restricts counter rotation. Lever handle stop 64 can be constructed of any rigid material. In this embodiment lever handle 64 is constructed of steel and is welded to lever arm 18L.

Referring to FIG. 4, a manual lever lock hole 50R is indicated in housing side plate 16R. A similar hole 50L is located in plate 16L. Holes 50R and 50L provides a secondary means for securing lever arms 18 in the up position. With lever arms 18 in the up position a bolt, lock pin or similar rigid material is inserted through hole 50 acting as a stop.

Lever handle 22 is interconnected to latch bar 24 by a spring 26. Spring 26 is attached to lever handle 22 and latch bar 24 by inserting ends of spring26 into and through lever handle spring mounting hole 62 and latch bar spring mounting hole 60 respectively. Latch bar spring mounting hole 60 is offset from the rotational center of latch bar 24. This offset provides the desired rotation of latch 24 as lever handle 22 is rotated about lever handle mounting assembly 66. In this embodiment, both latch bar 24 and lever handle 22 are constructed of steel plate of sufficient thickness to perform the functions described herein without deformation. However any rigid material of sufficient rigidity to resist the loads imparted could be substituted. Spring 26 is constructed of steel wire of sufficient gauge to resist permanent deformation by the loads imparted on the spring.

Referring to FIG. 2, a latch 30 is indicated in top view. In this embodiment, latch 30 consists of a flat steel plate with a latch receiving recess 31. Latch 30 is welded to the housing rear plate 14 with the top edge flush to the top edge of housing rear plate 14 and with sufficient side clearance from lever arm 18L to allow lever arm 18L to rotate clear. Latch 30 is indicated in side view in FIG. 5. The leading or front edge of latch 30 is curved to guide and rotate latch bar 24 into the latch receiving recess 31 as the lever arms 18 are rotated into the up position. The width of latch receiving recess 31 is slightly wider than the thickness of the latch bar 24. This additional width allows the user to apply a force opposite that imparted by the weight of receptacle or article being transported thereby releasing friction between latch bar 24 and latch receiving recess 31 enabling the latch bar to rotate free of the latch 30.

Referring back to FIG. 2, a latch bar stop 32 is indicated. The latch bar stop 32 consists of flat steel plate inserted into a groove located in housing side plate 16L. The depth and width of latch bar stop 32 is similar to the depth and width of the groove. Latch bar stop 32 protrudes beyond the interior wall of housing side plate 16L sufficient length to allow latch bar 24 to swing behind when in the latched position and restrict the axial twisting of latch bar 24 in the latched position. Clearance between the latch bar stop 32 and lever arm 18L is provided to allow rotation of lever arms 18. The rear edge of the latch bar stop 32 aligns with front edge of latch receiving recess 31. Latch bar stop 32 is secured to housing side plate 16L by a weld placed along the intersection of the housing side plate l6L and the front edge of latch bar stop 32. This weld placement allows the latch bar 24 to fit tight against the latch bar stop 32 unobstructed by the weld.

Figure 6:
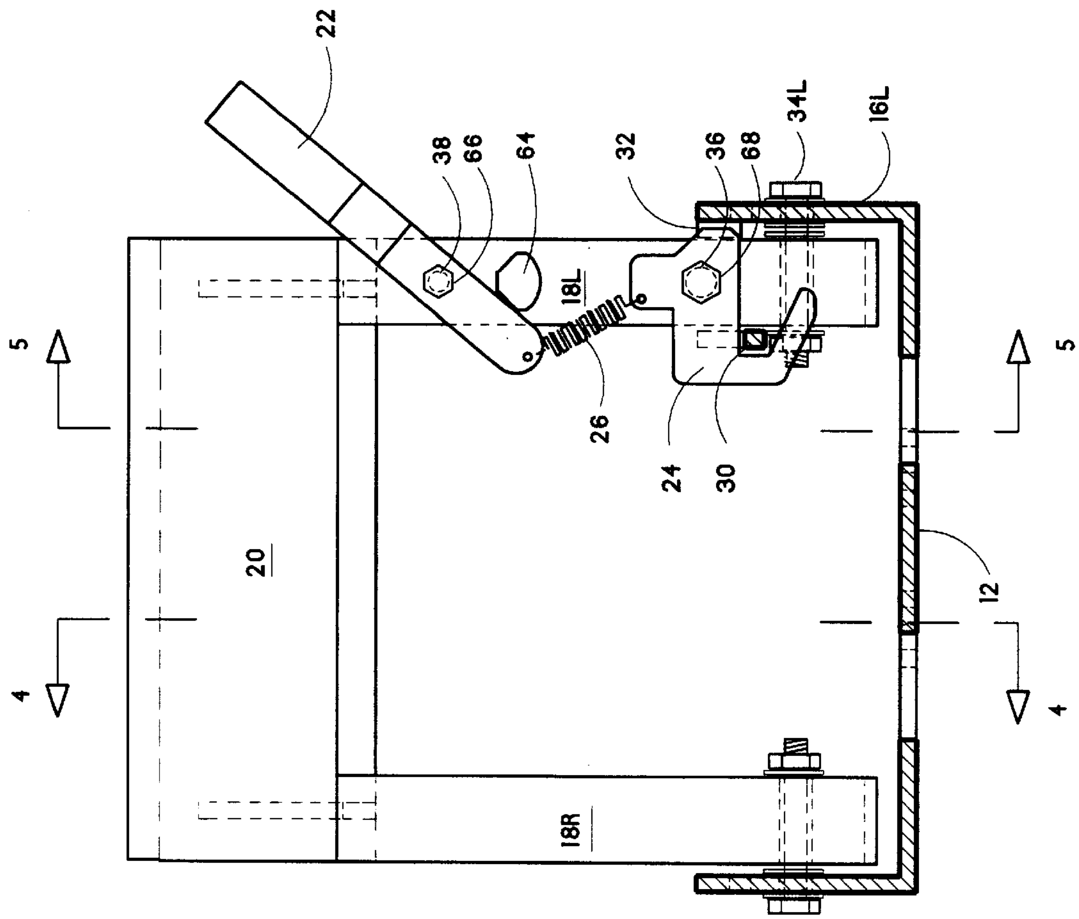
FIG. 6 shows a longitudinal section with the lever handle/latch bar assembly in the latched position.
Figure 7:
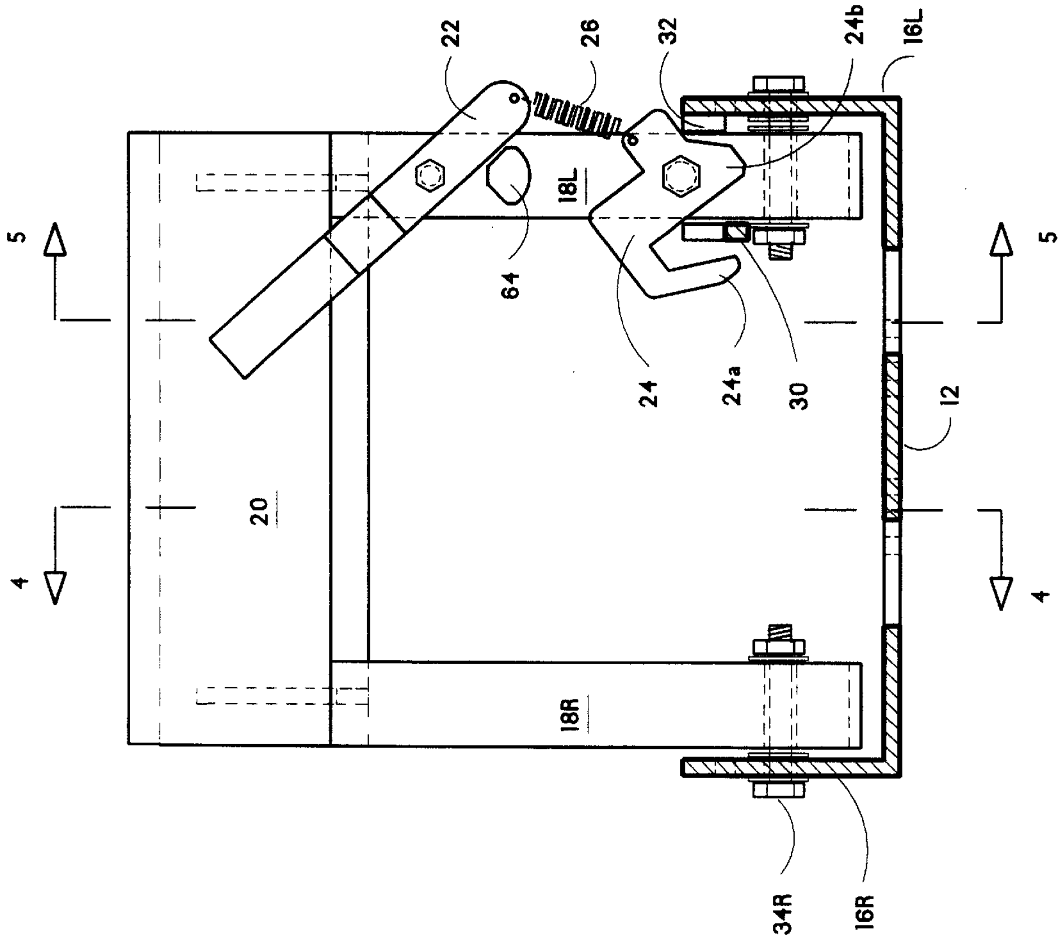
FIG. 7 shows a longitudinal section with the lever handle/latch bar assembly in the unlatched position.

Latch bar 24 is indicated in the latched position in FIG. 6 and in the unlatched position in FIG. 7. Latch bar 24 secures lever arms 18 and the article of transport in place. The shape of latch bar 24 is designed to rotate about latch bar mounting assembly 68. The length of a latch bar hook 24*a* is sufficient to rest against the side of latch 30 thereby acting as a guide during rotation of the lever arms 18. When latch bar 24 is rotated into the latched position by means disclosed hereinafter the hook end of latch 24 designated as latch bar hook 24*a* is positioned under latch 30 and prohibits premature release of the latch. The portion of latch bar 24 which is designated as latch bar stop end 24*b* is configured to allow rotation along side and behind latch bar hook 32.

Referring to FIG. 2 a section of housing rear plate 12 having a one inch diameter hole is designated as a hitch hole 42 which is located in the longitudinal center of housing bottom plate 12. Hitch hole 42 is located sufficient distance from housing rear plate 14 to allow a trailer coupler to be connected to a hitch ball inserted in hitch hole 42 and allow unobstructed movement of the trailer coupler.

Anti-rotation holes 44L and 44R located in housing bottom plate 12 are positioned equal-distance in pairs left and right of the center line of hitch hole 42. Machine bolts with nuts are inserted into the appropriate set of holes and act as stops on each side of a hitch bar to resist rotation of housing bottom plate 12 about hitch hole 42. A series of anti-rotation holes 44L and 44R are provided to accommodate several standard widths of hitch bars.

A bottom mounting hole 46L and 46R are located in housing bottom plate 12 at the intersection of housing rear plate 14. Bottom mounting hole 46L and 46R are located equal distances from housing side plate 16L and 16R respectively and clear of latch 30. Length and width of bottom mounting hole 46L and 46R are of sufficient size to accommodate the vertical return of a bracket 56.

Figure 3:
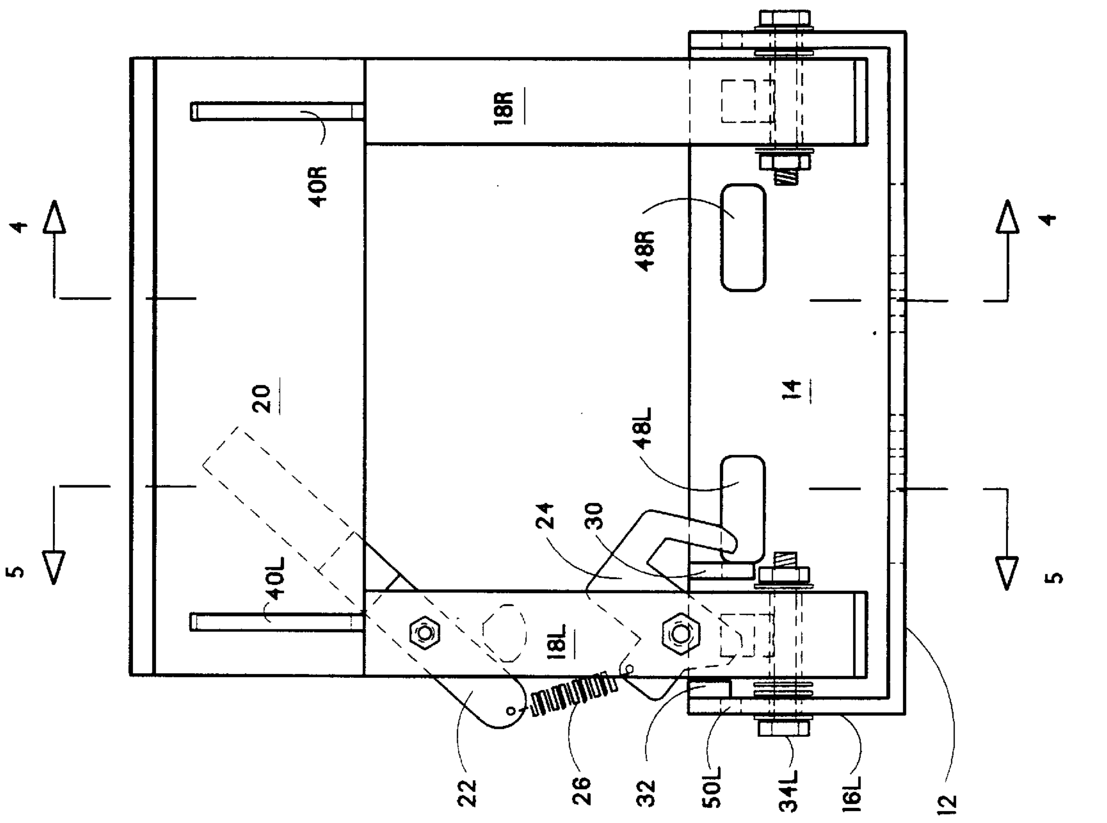
FIG. 3 shows the front view with the lever arms in the up position. The lever handle/latch bar assembly is indicated in the unlatched position.

Referring to FIG. 3, two locations of housing rear plate 14 having a rear mounting hole 48L and 48R are located directly in line with portions of housing bottom plate 12 having bottom mounting hole 46L and 46R. The width of mounting holes 46 and 48 are approximately twenty percent wider than the width of bracket 56.

Referring to FIG. 8*a* and 8*b* bracket 56 is illustrated in front and side view respectively. Bracket 56 consists of flat steel plate with a horizontal offset and vertical return at top and bottom. The length of bracket 56 between horizontal offsets corresponds to the distance between bottom mounting hole 46 and rear mounting hole 48. Referring to FIG. 9*b*, a view of housing rear plate 14 and housing bottom plate 12 is illustrated in conjunction with bracket 56. The depth of the horizontal offset of bracket 56 is sufficient to accommodate the combined width of housing rear plate 14 and the mounting bolt head between the vertical segments of bracket 56. The length of the vertical returns of bracket 56 are slightly less than the vertical dimension of rear mounting hole 48. Two bracket mounting holes 58 are located along the center line of bracket 56. In this embodiment, bracket 56 is constructed of steel plate formed or welded into the shape illustrated. However any rigid material of sufficient rigidity to resist the loads imparted could be substituted.

The carrier is designed to mount on the exterior of a passenger or light truck vehicle by several methods. In FIG.

9*a* the carrier is attached to a conventional trailer towing hitch bar 76 with a conventional hitch ball 74 or bolt. The carrier can also be attached to a vehicle bumper hitch in a similar manner. This attachment is accomplished by positioning the hitch hole 42 located in housing bottom plate 12 over the hole in the hitch bar 76 or bumper hitch and inserting the treaded portion of the hitch ball 74 through hitch hole 42 and the hitch hole of the hitch bar 76 or bumper hitch. The hitch ball 74 is secured in place with the application of a threaded nut and lock washer, thus clamping the housing bottom plate 12 and hitch bar or bumper hitch together. Rotation of the housing bottom plate 12 is restricted by anti-rotation holes 44. A series of anti-rotation holes 44L and 44R are located left and right of the centerline of hitch hole 42. Pairs of anti-rotation holes 44 are positioned at different dimensions from centerline of hitch hole 42 to accommodate several standard widths of hitch bars. Bolts are inserted into the pair of anti-rotation holes 44 which correspond to the width of the hitch bar in use. The corresponding anti-rotation holes 44 are spaced wider apart than the hitch bar width to allow for the insertion of bolts, washer and nut assembly. This bolt, washer, and nut assembly located on each side of the hitch bar act as stops to prohibit rotation about hitch hole 42. In the case of a bumper hitch, the user can drill holes in the horizontal portion of the bumper corresponding to anti-rotation holes 44 and insert bolts to prohibit rotation.

A feature of the carrier, when mounted as described above and with the swing arms latched in the up position, is that a trailer coupler can be attached to the hitch ball without removing the carrier. Therefore normal towing can occur with the carrier in place.

FIG. 9*b* indicates an alternate method of mounting. Brackets 56 are mounted to a vehicle bumper 80 with treaded bolts and secured with washers, lock washers and nuts. Bracket 56 is mounted in pairs with the longitudinal centerline of the bracket pair corresponding to the centerline of bottom mounting holes 46L and 46R and rear mounting holes 48L and 48R. The upper vertical return of bracket 56 is inserted into rear mounting hole 48 and the lower vertical return of bracket 56 is inserted into the bottom mounting hole 46. Housing rear plate 14 is now suspended from brackets 56. Housing rear plate 14 is held in place vertically by gravity and horizontally by the two mounting holes 46, 48 and bracket 56 combination. This method of attachment allows the quick installation and removal of the carrier and would typically be used on vehicles which are not equipped with trailer towing devices.

FIG. 9*c* indicates another alternate method of attachment which comprises of a pair of straps 70 inserted through the left and right pairs of bottom mounting hole 46 and rear mounting hole 48. Each end of the straps 70 are secured to the vehicle at the edge of the bumper, trunk opening or other edge by means a strap hook 72 attached to the ends of the straps 70. The straps 70 are then tighten which secure the carrier tight against the bumper of the vehicle 80.

OPERATION OF THE INVENTION

With the carrier mounted by one of the methods described herein and with the lever arms 18 in the down position, the user manually rotates lever handle 22 clockwise. As the lever handle is rotated, tension in spring 26 which is connected to both lever handle 22 and latch bar 24 is increased and translates a counter-clockwise rotational force to latch bar 24. Rotation towards the latched position (counter-clockwise) of latch bar 24 is restricted by the end of latch bar hook 24*a* resting on the side of latch 30.

In the static position lever handle 22 rest in the concave surface of lever handle stop 64 and is in a parallel plane with lever arm 18L. As lever handle 22 is rotated the lever handle passes over the ever increasing thickness of the concave surface. This action lifts the portion of lever handle 22 directly over lever handle stop 64 out of plane. Rotation is continued until lever handles 22 passes completely over lever handle stop 64 and therein released back to parallel plane. In this position the vertical edge of lever handle stop 64 now prohibits the lever handle from being pulled back by spring 26 to the static position.

The carrier is now ready to be loaded. In the case of transporting wheeled trash receptacles having a horizontal lift bar the user aligns the horizontal receptacle lift bar with the receiver channel 20. Alignment of lift bar and receiver channel 20 can be accomplished by tilting the trash receptacle on the wheels thereby lowering the lift bar to the desired height. The user places the horizontal lift bar of the receptacle inside receiver channel 20 and applies a horizontal and slightly upward force to the trash receptacle. This force causes the lever arms 18 to rotate about lever arm mounting assembly 34 in the upward direction and lifting the trash receptacle clear of the ground.

As lever arms 18 are rotated, the end of latch bar hook 24*a* slides against the side of latch 30 prohibiting counter-clockwise rotation of latch bar 24. Rotation of lever arms 18 are continued and latch bar 24 is brought in contact with the leading or front edge of latch 30. The curved shape of this leading edge rotates the latch bar 24 clockwise increasing tension on spring 26. This additional rotation of latch bar 24 produced by latch 30 allows the portion of latch bar 24 designated as latch bar stop end 24*b* to rotate under and to the rear of latch bar stop 32. At this point the end of latch bar hook 24*a* is clear of latch 30 and rotation of latch bar 24 is restricted by contact with the leading edge of latch 30 as described above. Rotation of lever arms 18 continues until latch bar 24 aligns with the latch receiving recess 31 in latch 30. Upon this alignment, tension in spring 26 rotates latch bar 24 into latch receiving recess 31.

Now in the latched position, latch bar 24 is held in place by a combination of factors. The remaining counter-clockwise rotational force imparted by spring 26 pulls latch bar 24 into the latch receiving recess 31 of latch 30. The center of mass of the trash receptacle is offset from the center of rotation of lever arms 18. This offset imparts a force to lever arms 18 thereby pulling latch bar 24 tight against latch bar stop 32 and the interior wall of the latch receiving recess 31. Latch bar stop 32 acts to distribute the load imparted on latch bar 24 equally about latch bar 24's center of rotation. The latch bar hook 24*a* extends under latch 30 and prohibits the axial twisting out of plane of latch bar 24. The axial twisting if not addressed causes rotational creep resulting in premature release of the latch. In the latched position, the trash receptacle is suspended clear of the ground and secured in place ready for transport.

With lever arms 18 in the up position a bolt, lock pin or similar rigid material can be inserted through hole 50 as a secondary means to secure lever arms 18 in the up position. One end of the bolt or lock pin remain in hole 50 and the other end extends across the width of lever arm 18. With the bolt or pin in place, lever arms 18 are unable to rotate should the latch assembly open prematurely. The use of hole 50 as described is a precautionary measure and would not be required under normal operations.

With the trash receptacle in the suspended and latched position, the transport vehicle is unrestricted in movement and can deliver the trash receptacle to the point of discharge. To lower the receptacle and lever arms 18 the user must first reposition lever handle 22. The users applies a force to the top of lever handle 22 which lifts the opposite end of the lever handle 22 sufficient to clear the vertical edge of lever handle holder 64. The user then rotates lever handle 22 in the opposite direction as previous detailed above (counter-clockwise). This rotation applies tension to spring 26 which translates a clockwise rotational force to latch bar 24. Lever handle 22 rotates to the opposite side of lever handle holder 64 beyond the opposite vertical edge and is held in place as previously described. At this point latch bar 24 remains in the latched position due to the frictional force between latch bar 24 and the latch receiving recess 31 and, latch bar stop 32. This frictional force is supplied by the center of mass of the receptacle being offset from the rotation center of lever arms 18, causing latch bar 24 to be held tight to latch receiving recess 31 and latch bar stop 32.

The latch receiving recess 31 is slightly wider than the thickness of latch bar 24. The user positioned behind the trash receptacle now applies a force to the receptacle opposite in direction to the gravitational force produced by the trash receptacle. This allows latch bar 24 to move within latch receiving recess 31 a sufficient distance to release the frictional force on latch bar 24. The release of friction allows the rotational force imparted by spring 26 to rotate latch bar 24 clockwise. The clockwise rotation moves latch bar 24 clear of latch 30 and latch bar stop 32 which allows the user to lower the receptacle and lever arms 18 in a controlled manner. Once on the ground, the user wheels the trash receptacle clear of receiver channel 20.

Lever arms 18 can now be rotated into the up position and secured by latch bar 24 as previously described. The carrier can be left attached to the hitch bar, or the hitch bar and carrier removed or in the case of the bracket mounted carrier, the carrier can be removed from the brackets and stored in the vehicle until further use.

ADVANTAGES OF THE INVENTION

With the trash receptacle in the suspended and latched position, the transport vehicle is unrestricted in movement. The transport vehicle may backup, move forward, and make sharp turns without any special consideration. Other devices for transport such as trailers restrict vehicle movement or require special attention when maneuvering. The trash receptacle is suspended in receiver channel 20 which has a depth sufficient to prohibit the receptacle from being jolted out of the channel on rough roads. The trash receptacle is held in place by guide plates 40 and the front edge of housing side plates 16 prohibiting tipping or overturning of the receptacle when transporting on steep terrain. This is a clear advantage over transporting a trash receptacle in a trailer or the bed of a pickup truck where the receptacle easily tips over during transport. The mechanical advantage of lever arms 18 reduce the amount of effort required of the user to position the trash receptacle for transport. This is a clear advantage over other methods of transport where the full weight of the receptacle must be lifted such as in the bed of a pickup truck. Many of the larger trash receptacles allow a load up to 250 pounds. Clearly a user would not want to lift this full weight.

What is claimed is:

1. A carrier for carrying waste receptacles, comprised:

a housing, said housing having a bottom plate, a rear plate, and a pair of side plates;

a right lever arm and a left lever arm, said right and left lever arms being joined to each other by and terminating at one of their ends in a receiving channel carrying a waste receptacle; said right and left lever arms being rotatably secured to respective ones of said pair of housing side plates to rotate about a lever arm rotation axis;

a latch having a recess; said latch mounted to said housing;

a latch bar pivotally secured to one of said lever arms;

a spring, said spring being secured to said latch bar and to a lever handle pivotally mounted to said one of said lever arms; the tension in said spring rotating said latch bar into engagement with the recess of said latch upon rotation of said right and left lever arms from a loading/unloading position into a latched transport position; and means for mounting said housing to a vehicle.

2. The carrier for carrying waste receptacles of claim 1, wherein said housing is composed of metal.

3. The carrier for carrying waste receptacles of claim 1, wherein said right lever arm and said left lever arm are pivotally secured to said housing side plates by a lever arm mounting assembly.

4. The carrier for carrying waste receptacles of claim 1, wherein said receiving channel is a metal channel comprised of walls, said right lever arm and said left lever arm welded to one of said walls of said metal channel.

5. The carrier for carrying waste receptacles of claim 1, wherein said latch bar is mounted to one of said lever arms by a latch bar mounting assembly.

6. The carrier for carrying waste receptacles of claim 1, wherein said lever handle is operably secured to said latch bar by said spring by mounting said spring through an aperture in said lever handle and an aperture in said latch bar.

7. The carrier for carrying waste receptacles of claim 1, further including a latch bar stop secured to said housing.

8. The carrier for carrying waste receptacles of claim 7, further including a lever handle holder mounted on said one of said lever arms; said lever handle holder engaging a side of said lever handle to prevent pivoting of said lever handle and wherein a center of mass of a waste receptacle carried by said receiving channel when said lever arms are in said latched transport position is offset from said lever arm rotation axis by an offset distance, said offset distance imparting a frictional force between said latch bar, said recess and said latch bar stop.

9. The carrier for carrying waste receptacles of claim 8, wherein said lever arms are rotated from said latched transport position to said loading/unloading position by pivoting said lever handle over said lever handle holder, wherein said frictional force imparted by said waste receptacle due to said offset distance counteracts the rotational force imparted on said latch bar by said spring when said lever handle is pivoted over said lever handle holder and wherein moving said waste receptacle carried by said receiving channel in a direction opposite to a direction of gravitational force applied to said waste receptacle eliminates said frictional force and allows the tension in said spring to rotate said latch bar out of engagement with said recess thereby permitting rotation of said lever arms into said loading/unloading position.

10. A carrier mounted to a vehicle, for carrying and transporting articles, comprised:

a housing, said housing having a bottom plate, a rear plate, and a pair of side plates;

a pair of lever arms, said lever arms being joined to each other by and terminating at one of their ends in a receiving channel carrying an article; each of said pair of lever arms being rotatably secured to respective ones of said pair of housing side plates to rotate about a lever arm rotation axis;

a lever arm stop, said lever arm stop being operably secured to said housing;

a latch having a recess, said latch mounted to said housing;

a latch bar pivotally secured to one of said lever arms; and a spring, said spring being secured to said latch bar and to a lever handle pivotally mounted to said one of said lever arms; the tension in said spring rotating said latch bar into engagement with the recess of said latch upon rotation of said pair of lever arms from a loading/unloading position into a latched transport position.

11. The carrier mounted to a vehicle of claim 10, further including a bracket means for mounting said housing to said vehicle.

12. The carrier mounted to a vehicle of claim 10, further including a means for securing said housing to a tow hitch assembly.

13. The carrier mounted to a vehicle of claim 10, wherein said pair of lever arms are rotatably secured to said housing side plates by a lever arm mounting assembly.

14. The carrier mounted to a vehicle of claim 10, wherein said receiving channel is a metal channel having walls; said pair of lever arms welded to one of the walls of the receiving channel.

15. The carrier mounted to a vehicle of claim 10, wherein said latch bar is mounted to one of said lever arms by a latch bar mounting assembly.

16. The carrier mounted to a vehicle of claim 10, wherein said lever handle is operably secured to said latch bar by said spring by mounting said spring through an aperture in said lever handle and an aperture in said latch bar.

17. The carrier mounted to a vehicle of claim 10, wherein said latch includes a curved front edge portion.

18. The carrier mounted to a vehicle of claim 10, further including a latch bar stop secured to said housing.

19. The carrier mounted to a vehicle of claim 18, further including a lever handle holder mounted on said one of said lever arms; said lever handle holder engaging a side of said lever handle to prevent pivoting of said lever handle and wherein a center of mass of an article of transport carried by said receiving channel when said lever arms are in said latched transport position is offset from said lever arm rotation axis by an offset distance, said offset distance imparting a frictional force between said latch bar, said recess and said latch bar stop.

20. The carrier mounted to a vehicle of claim 19, wherein said lever arms are rotated from said latched transport position to said loading/unloading position by pivoting said lever handle over said lever handle holder, wherein said frictional force imparted by said article due to said offset distance counteracts the rotational force imparted on said latch bar by said spring when said said receiving channel in a direction opposite to a direction of gravitational force applied to said article eliminates said frictional force and allows the tension in said spring to rotate said latch bar out of engagement with said recess thereby permitting rotation of said lever arms into said loading/unloading position.

* * * * *